United States Patent [19]

Ahlgren et al.

[11] 4,191,881

[45] Mar. 4, 1980

[54] FOOD OVEN

[75] Inventors: David W. Ahlgren, Duluth; David A. Hassell, Coon Rapids; Elvis S. Zimmer, Blue Hill Township, Mille Laks County, all of Minn.

[73] Assignee: Jeno F. Paulucci, Duluth, Minn.

[21] Appl. No.: 866,736

[22] Filed: Jan. 3, 1978

Related U.S. Application Data

[62] Division of Ser. No. 673,114, Apr. 2, 1976, Pat. No. 4,164,991.

[51] Int. Cl.² ............................................. A47J 37/06
[52] U.S. Cl. ..................................... 219/388; 99/365; 99/443 R; 219/411
[58] Field of Search ................... 219/388, 388 C, 389, 219/410, 411; 99/443 R, 362, 365, 341, 443 C, 448

[56] References Cited

U.S. PATENT DOCUMENTS

| | | | |
|---|---|---|---|
| 1,517,271 | 12/1924 | Woodson | 219/388 |
| 3,249,741 | 5/1966 | Mills | 219/388 C |
| 3,372,636 | 3/1968 | Marasco | 99/443 R |
| 3,492,938 | 2/1970 | Oxford | 99/443 R |
| 3,515,854 | 6/1970 | Williams | 219/388 C |
| 3,552,299 | 1/1971 | Patoka | 99/448 R |
| 3,847,069 | 11/1974 | Guibert | 219/388 C |
| 4,004,129 | 1/1977 | Hicks | 219/388 |

*Primary Examiner*—B. A. Reynolds
*Assistant Examiner*—Bernard Roskoski
*Attorney, Agent, or Firm*—Henry C. Kovar

[57] ABSTRACT

A rotary type oven for articles of food having a broiling zone with a radiant electrical heater, a baking zone and a toasting zone having a convective electrical heater; the oven is of the helical track type with the zones being one above another.

8 Claims, 7 Drawing Figures

FOOD OVEN

RELATED APPLICATIONS

This application is a division of our co-pending application Ser. No. 673,114 filed on Apr. 2, 1976, now U.S. Pat. No. 4,164,991.

BACKGROUND OF THE INVENTION

1. Field of the Invention

This invention pertains to an electrical oven for articles of food, the oven has distinct broiling, baking and toasting zones.

2. Prior Art

Hot food articles, such as pizzas, are frequently prepared at the place of consumption, and the article may be sized to constitute a single serving. It has been found that in attempting to bake such articles rapidly, there is a tendency for the baking to be uneven. This problem is heightened by the fact that the same equipment will typically be use for baking a pizza that beings in the frozen state as well as one that begins in the unfrozen state, and of course, the degree of freezing can vary from point to point on a particular pizza, thereby causing uneven rising, uneven baking and uneven browning, and in some instances even causing burning before the article is ready for consumption. There can be superficial overcooking with inadequate rising of dough. to resolve such problem in the past, a separate oven has been utilized to thaw the dough before baking, and such an arrangement becomes burdensome in that the operator needs to use two ovens, needs to have multiple opening and closing of doors, and is placed at a disadvantage in needing to estimate baking time.

A concept for solution to the foregoing heating problem in provided by the oven of U.S. Pat. No. 3,846,069. This oven has a vertical axis helical track of several levels with electric heating elements in between the track levels and a rotatable reel for advancing circular food packages down the track and over the heating elements. An important feature of U.S. Pat. No. 3,847,069 is the provision of epicyclic movement of a food package to give even heating of the food.

U.S. Pat. No. 3,847,069 discloses two configurations of heating elements, in the first there is a continual length of heating element mounted underneath a relatively wide open track from the top of the bottom of the track. A second and alternative configuration is disclosed having a top section of track without a heater and a bottom section of track with a heater, the top section in the oven of U.S. Pat. No. 3,847,069 being referred to as a warming zone and the bottom section in the oven of U.S. Pat. No. 3,847,069 being referred to as a baking zone.

The oven of U.S. Pat. No. 3,847,069 will cook a food item as described therein.

However, it has been found that this oven will not interchangeably and properly heat either of a frozen or a refrigerated but unfrozen food article. It has been found that this oven cannot apply extremely high intensity of heats and that the oven must use relatively low heat intensities and therefore take a relatively lengthy period of time per food article. This oven has alo been found to need a lengthy track and a large oven chamber which results in high cost of manufacture and a rate of heat loss through the cabinet which makes for a very high power consumption as well as requiring a high amperage power source. This oven required a continual input of power at a level sufficient to heat a food product, regardless of whether or not there was food in the oven and the heater arrangement also made no provision for varying the power output of the heater as the food load in the oven was increased or decreased or removed.

Further, the structure of the oven of U.S. Pat. No. 3,847,069 has been found prohibitively expensive for commercial usage and has been found difficult to build, to assemble, and to clean. It will be appreciated that any food oven is subject to spattering and collection of grease and cooking residue and must be cleanable and periodically cleaned in the public interest.

It is also realized that ovens of this type can no longer be inefficient users of energy and that massive applications of energy far in excess of actual workload are no longer tolerable or monetarily affordable.

It has been the past practice to slowly heat frozen or refrigerated foods in a convection oven and an oven of this type can be seen in any pizza shop and every individual who has ordered a pizza is well aware that the cooking time is in the range of 15 minutes to one half hour. This time is also required for pies and the like which are usually cooked in a person's home. The faster alternative has been a microwave oven but the food cooked by a microwave oven is usually not browned and these ovens are extremely expensive and handle only a single or a few items of food at one time and do not allow opening of the oven chamber while in operation.

OBJECTS OF THE INVENTION

It is an object of the present invention to provide an electrically powerable oven which utilizes both radiant and convective hot air heat for the cooking of food articles.

It is an object of the present invention to provide an electric food oven having a helical track and an electric heater with the oven being of minimum size.

It is an object of the present invention to provide an electrically heatable food oven having separate broiling, baking and toasting zones and a rotary food mover.

It is an object of the present invention to provide an electrically heatable oven which is operable at relatively high oven temperatures and is very efficient and uses relatively little electricity.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

SUMMARY OF THE INVENTION

In accordance with this invention, a rotary type electrically heatable food oven is provided having a broiling zone with an electric radiant heater, a toasting zone with an electric convective air heater, and a baking zone between the broiling and toasting zones; a rotary oven having a helical track with an electric heating element mounted atop of the track is also provided in accordance with the present invention.

ON THE DRAWINGS

AS SHOWN ON THE DRAWINGS

Figure 1:
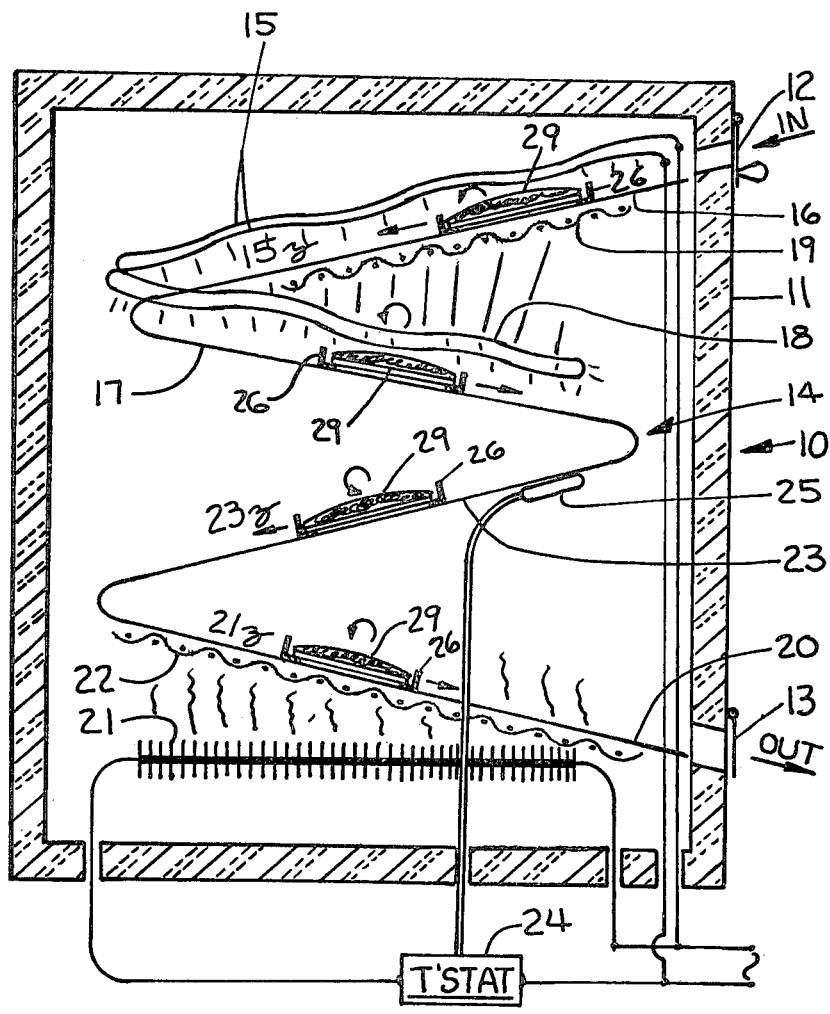
FIG. 1 is an elevational cross sectional schematic view of a schematic electric oven for practice of a method of cooking food.

In FIG. 1 a schematic food oven, generally indicated by the numeral 10, is provided for practicing a method of cooking an article of food.

The oven 10 has an insulated cabinet 11 with an inlet 12 and an outlet 13. Inside of the cabinet 11 there is a track 14 for supporting food articles in the oven 10. The track 14 is a conveyer type and may be round, helical, flat, sloped or some kind of a zig-zag as shown. There is a radiant electrical heater element 15 mounted atop the track 14. The track 14, as shown has a first portion 16 immediately adjacent to the inlet 12 and a second portion 17 which turns under first portion 16. The radiant heater 15 is mounted above both the first and second portions 16, 17 and has an end 18 mounted on top of the track second portion 17 and this heater end 18 is underneath the first track portion 16. There may be a screen 19 between the first track portion 16 and the heater end 18. The portion of the track 14 having the radiant heater element 15 above it is referred to herein as the broiling zone 15z.

The track 14 has a bottom portion 20 leading to the outlet 13. Underneath the bottom track portion 20 there is a convective heater element 21 for heating air and which also provides some radiant heat. There is a screen 22 between the convective heater 21 and bottom track portion 20. The portion of the track 14 on top of the convective heater 21 is also referred to herein as the toasting zone 21z.

The track 14 also has an intermediate section 23 not directly exposed to either of the heater elements 15 or 21; this portion 23 of the track is heated by convection from the heater elements 15, 21 and referred to herein as the baking zone 23z.

The radiant heater 15 is of lesser wattage than the convective heater 21; specifically the radiant heater 15 may be of 575 watts and the convective heater 21 may be of 2000 watts. The radiant heater 15 is normally on and maintains the temperature of the oven at about 600°-700° F. (315°-375° C.) and the convective heater 21 is normally off. There is a thermostat 24 which is connected to turn on the convective heater 21 and this thermostat 24 has a sensor element 25 located in the baking zone 23z. It has been found advantageous to locate this sensor 25 directly below the inlet 12.

Figure 2:
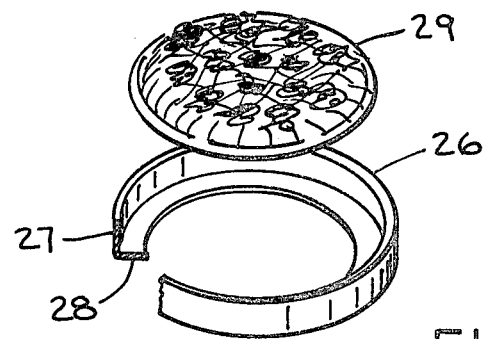
FIG. 2 is a top perspective view of a food tray and an article of food specifically for the oven of the present invention.

FIG. 2 shows a tray 26 which is a pan having a cylindrical rim 27 and an annular flange 28. The tray 26 has an open bottom inside of the flange 28. A food article 29 is placed in the tray 26 and is supported by the flange 28. The tray 26 and the food article 29 are run through the oven 10 together as a package.

In the practice of the present method, the food article 29 is kept refrigerated for precluding spoilage and is placed while in the refrigerated state, either frozen or unfrozen, into the tray 26 and then into the oven 10 through inlet 12 and onto the first portion 16 of the track 14.

The food article 29 for which the oven 10 is extremely advantageous, is a particular configuration. It is a layered food having at least two layers. Specific examples of this type of food are pizzas, tostadoes, pot pies, fruit pies and sandwiches. Regardless of generic name, the food is characterized by a crust of some type and has a topping on the crust. The topping has a higher specific heat than the crust because of a higher moisture content. The crust is bread, either soft or hard and may be of such things as wheat, corn, potato, rice flowers and the like. The topping, which term includes a filling if the crust is cupped in the shape of a pie crust, typically will be one of tomato, cheese, meat or fish, fruit, vegetables, egg and the like. All of these toppings have a high moisture content and require much more heat for thawing and/or cooking than does the crust. Because of the higher specific heat of the topping, a relatively intense heat can be directed at the topping, this heat being of an intensity that would burn the crust were it applied to the crust. It has also been found advantageous to slowly heat the crust so that the bottom remain relatively porous, and then lastly to brown the crust just before discharging the food from the oven. If the crust were browned first or early in the cooking cycle, it would retain the moisture seeping into the crust from the topping and would become undesirably soggy.

The food article 29 is placed in the oven 10 with the crust facing downward and the topping facing upward so that as the topping is melted, or made relatively fluid, it does not run or drip off the crust. The oven 10 is preheated to just about the desired cooking temperature. If the food article 29 is a pizza for example, the oven 10 air temperature will be at about 600° F. (315° C.). The temperature of the air in the oven 10 is held at the preheat temperature by the broiling zone radiant heater 15 which is normally on. If the power supply voltage is low, the convective heater 21 may occasionally cycle on and off to maintain such a high temperature. The radiant heater 15 is sized to have a normal power output, with normal voltage, sufficient to maintain the oven at the desired temperature without, or with minimal assistance from, the convection heater 21.

When the food article 29 is placed upon the track 14, it is immediately exposed to the hot air in the oven 10 and also to relatively high intensity radiant heat directed down upon the topping from the radiant heater 15. The food article 29 is moved along the length of track 14 and is advanced through the broiling zone 15z and under the radiant heater 15. As the food article 29 is being advanced through the broiling zone 15z, the crust is also exposed to some radiant heat from the heater 15 because the end portion 18 of the radiant heater 15 is under the first portion 16 of the track 14. The screen 19 serves to partially shield the crust from the radiant heat and prevents burning or premature browning of the crust. As the food article 29 is advanced through the broiling zone 15z, it goes past the part of the track 14 with the radiant heater 15 underneath and the application of radiant heat to the crust is terminated while the application of radiant heat to the topping continues. It has been found that a maximum amount of radiant heat can be applied if the time period for direct radiant heating of the topping is about twice the time period of direct radiant heating of the crust while in the broiling zone 15z.

When the food article 29 is first placed in the oven, the food article is cold and immediately begins to cool air inside the oven. The cooled air will draft down upon the thermostat sensor 25 and the convection heater 21 will be turned on. The convection heater 21 replaces the heat loss into the food article 29 and maintains air within the oven 10 at the preheated temperature within tolerable variations. The convection heater 21 has about three times the power of radiant heater 15 and creates a tremendous input of heat into the oven 10. Sensing of the oven air temperature in the baking zone 23z has been found extremely advantageous for quick turn-on and turn-off of the convection heater 21.

When the food article 21 reaches the end of the broiling zone 23z, the topping will have been thawed if it was frozen and it will also have been browned by the radiant heat. The crust will have been thawed if it was frozen and will also be warm. The food article 29 will be advanced along the track 14 and transferred into the baking zone 23z which is convectively heated by both heaters 15, 21. The food article 29 is advanced through the baking zone 23z and in this zone is exposed to hot air which gradually increases the average temperature of both topping and crust and serves to bake and even the temperature through the food article 29. The food article 29 is then transferred into a toasting zone 21z and as it is being advanced through the toasting zone 21z, the extremely hot air convectively rising upward from the convection heater 21 contacts the bottom of the crust of the food article 29. The convection heater 21, because of its high power output, also gives off some radiant heat and the screen 22 serves to protect the crust from being charred by such incidental radiant heat. It has been found that when the combined time of exposure to the partially shielded incidental radiant heat from convection heater 21 and the radiant heat from the heater 15 against the bottom of the crust is approximately equal to the time of direct radiant heating of the topping, both topping and crust are well and evenly browned. This result is produced by applying a lesser amount of radiant heat, from the heater 15, against the crust than against the topping. It has also been found preferable that the food article 29 be in the broiling zone 15z for a period of time greater than the time in either the baking zone 23z or toasting zone 21z in order to properly heat the topping. The topping, depending upon its composition relative to the crust, should be broiled by radiant heat from twenty-five to fifty percent of the time that the food article 29 is in the oven 10.

The food article 29 is evenly and continually advanced along the track 14 from the inlet 12 toward the outlet 13 and as the food article 29 is advanced, it is continually revolved about itself as it rides on the track 14. It has been found beneficial to revolve the food article 29 about itself at least one time in each of the broiling zone 15z, baking zone 23z, and toasting zone 21z, for even heating of the food.

When the food article 29 reaches the end of the track 14, it is automatically discharged from the toasting zone 21z and from the oven 10, possibly to a food warmer (not shown) or else to be immediately consumed.

The foregoing method has been found to allow and make possible the application of very intense heats and has shortened the time required to cook food articles 29. The method has been found useful for simultaneously cooking successive food articles 29 placed one behind the other in the oven 10. The radiant heater 15 gives off a predetermined radiant heat regardless of air temperature in the oven 10 and the convection heater 21 with its greater power maintains the air and therefor the baking temperature in the oven 10 as well as toast each food article 29. Further, a plurality of food articles 29 can be heated at one time, one after another with this method having transferring of the food from zone to zone.

FIGS. 3–7 illustrate the preferred structural embodiment of the food oven, generally indicated by the numeral 30, provided in accordance with the principles of the present invention. The oven 30 has an insulated base 31, an insulated cover 32 having an inlet 33 and an outlet 34, and an oven chamber 35 formed within and by the base 31 and cover 32. Within the oven chamber 35 there is a vertical axis annular trackway 36, here shown as a multilevel helix, and a co-axial drive reel 37 having drive members 38 for advancing a food article 29 around the trackway 36. The trackway 36 has an annular support surface 39 and a rim 40 for holding a food article 29 within a pan 26 as a package, such as that shown in FIG. 2 and previously described with respect thereto, on the support surface 39 with a portion of the food article 29 overhanging to the inside of the support surface 39. The drive reel 37 is rotatable about the axis of the trackway 36 by a motor 41. During rotation of the drive reel 37, the drive members 38 revolve through a circular path adjacent to the inner circular edge 42 of the support surface 39 and engage the overhanging portions of any food articles 29 via the pan 26 and advance the food articles 29 around the trackway 36.

A food article 29, specifically the food article 29 in and with the pan 26 as is shown in FIG. 2, is placed in the inlet 33 and upon a loading end 43 of the trackway 36 and the drive members 38 engage and advance the food article 29 around the down the trackway 36 to an unloading end 44 where the food article 29 falls off the trackway 36 and slides down a discharge ramp 45 and out of the oven chamber 35 through the outlet 34.

For the purposes of the present invention, the trackway 36 may have a flat support surface 39 in the shape of an annulus or a portion of an annulus or it may be helical as shown and may be of a single or a multiple level. Further, the drive members 38 may revolve either inside of the trackway 36 as shown, or outside of, above, or through the support surface 39. The important thing is that there is a conveyor for moving the food article 29 through a path inside the oven chamber 35 and through heating zones as will be explained.

An important feature of the oven 30 is that it has separate broiling, baking and toasting zones with the broiling and toasting zones having their own heating elements. There is an radiant heater element 46 which is above the support surface 39 and extends over a first portion of the support surface 39. The first portion of the support surface 39 having the radiant heater 46 thereover is the broiling zone 46z of the trackway 36. The radiant heater 46 extends directly over and above the trackway loading end 43 and from there extends about one and one-half turns above the support surface 39 and about one-half turn below the support surface 39. The radiant heater 46 has a looped end 47 where it is turned around to return back up the trackway 36, and the inlet 33 is at a level between the levels of the loading end 43 and the radiant heater 46. In the bottom of the oven chamber 35, there is a convective air heater 48 which given off an incidental amount of radiant heat. Directly atop the convective heater 48 is the last portion of the length of the trackway support surface 39. This last portion of the length of the trackway 36 is the toasting zone 48z. Between the broiling zone 46z and the toasting zone 48z there is an intermediate portion of the length of the trackway support surface 39, providing a baking zone 36z not having a heating element but which is heated by convection from both of the heaters 46, 48. When the trackway 36 is of a helical configuration as shown, the baking zone 36z is above the toasting zone 48z and the broiling zone 46z is above the baking zone 36z and it has been found advantageous that each of the zones 46z, 48z, 36z have at least one revolution or level of support surface 39.

The radiant heater 46 is connected directly to line power and is normally on. The radiant heater 46 is of sufficient power, with normal line voltage, to maitain the oven chamber 35 at a predetermined temperature, an example of which is 600° F. (315° C.). The convective heater 48 is of a much greater power than the radiant heater 46. For example in the oven 30 it has been found that a 575 watt radiant heater and a 2000 watt convective air heater work well in combination, and that the bottom convective heater 48 should have at least twice the wattage of the top radiant heater 46. The convective heater 48 is normally off and is controlled by a thermostat 49 having a sensor 50 mounted in the baking zone 36z and directly below the inlet 33 and directly above the outlet 34 with the inlet 33 and outlet 34 being one above the other. When the thermostat 49 senses either a predetermined drop in temperature or a predetermined low temperature, it turns on the convective heater 48 until the oven chamber 35 is heated to a shut off temperature. As an example, the thermostat may turn on at 575° F. (300° C.) and turn off at 675° F. (375° C.).

The trackway 36 is preferably formed of perforated sheet metal with the support surface 39 having perforations 39p with an area in the range of forty to sixty percent of the total area of the support surface 39. The perforated sheet metal support surface 39 is clearly shown in FIG. 4 which also shows a top view of the radiant heater 46 mounted above the support surface 39 and loading end 43.

Figure 5:
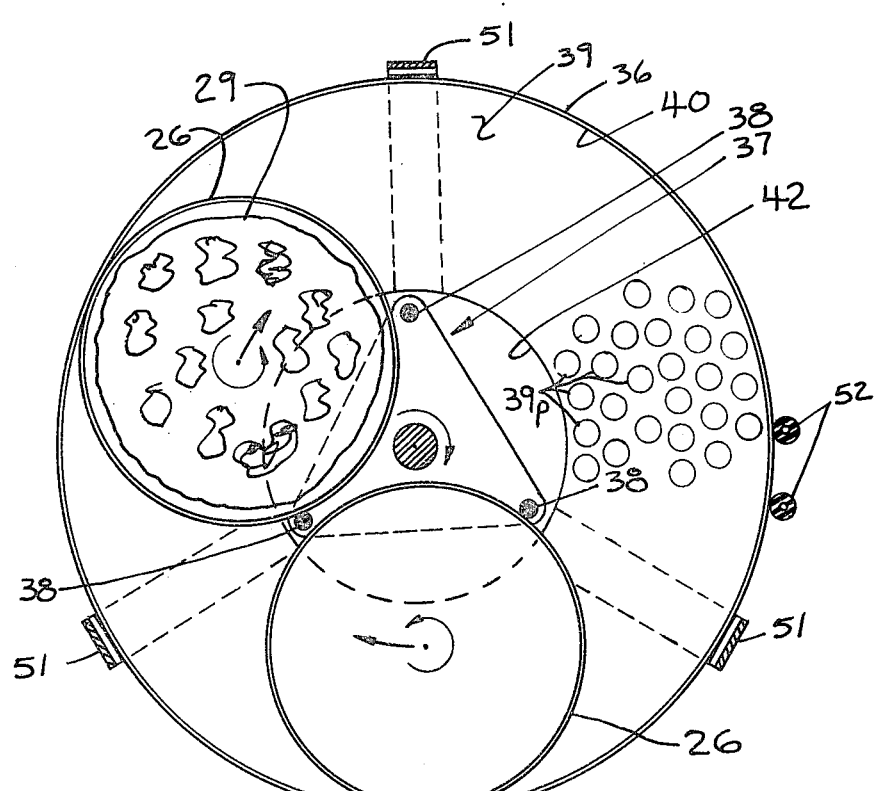
FIG. 5 is top sectional view taken along lines V-V of FIG. 3.

FIG. 5 shows the rotation of the drive real 37 with the drive members 38 engaging a food article tray 26, and the rim 40 retaining the food article 29 on support surface 39 while the drive members 38 advance the food article 29 around the trackway 36 in the pan 26. The food article 29 rides against the rim 40 and is turned about its own axis as it is advanced along the trackway 36.

Figure 6:
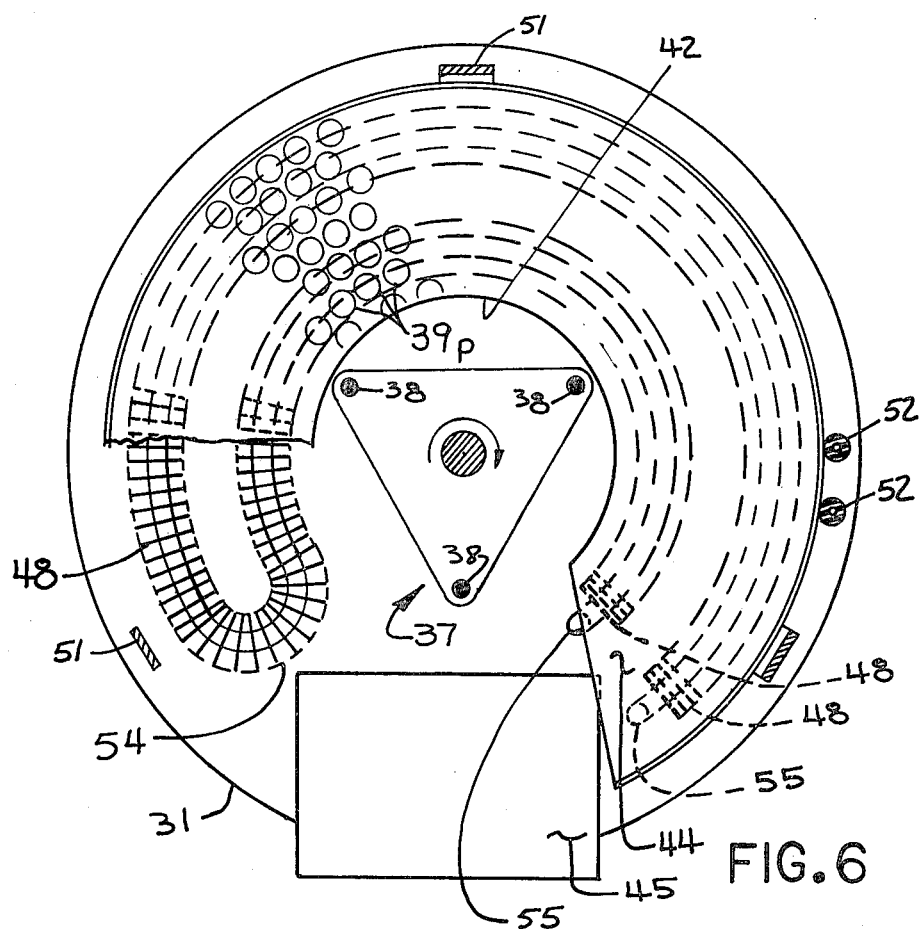
FIG. 6 is a top sectional view taken along lines VI-VI of FIG. 3.
Figure 7:
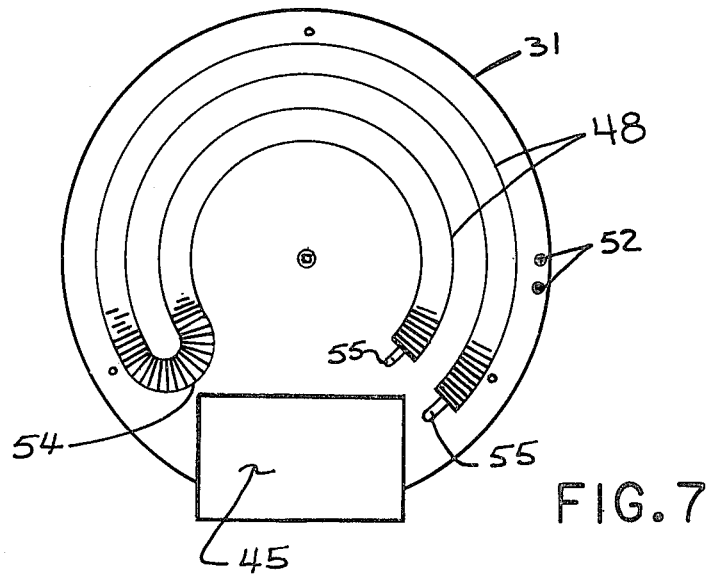
FIG. 7 is a top sectional view taken along lines VII-VII of FIG. 3.

FIGS. 6 and 7 illustrate the structure of the convective heater 48 which is mounted on the base 31. The convective heater 48 is shaped in the form of a semi-circular C-shape coil having an arcuate length of less than 360 degrees and a pair of ends 54, 55 one on each side of a space for and opening to the discharge ramp 45 and outlet 34. The ramp 45 and outlet 34 are both below the coil of the convective heater 48 so that hot air from the heater 48 will not rise out of the outlet 34.

Figure 3:
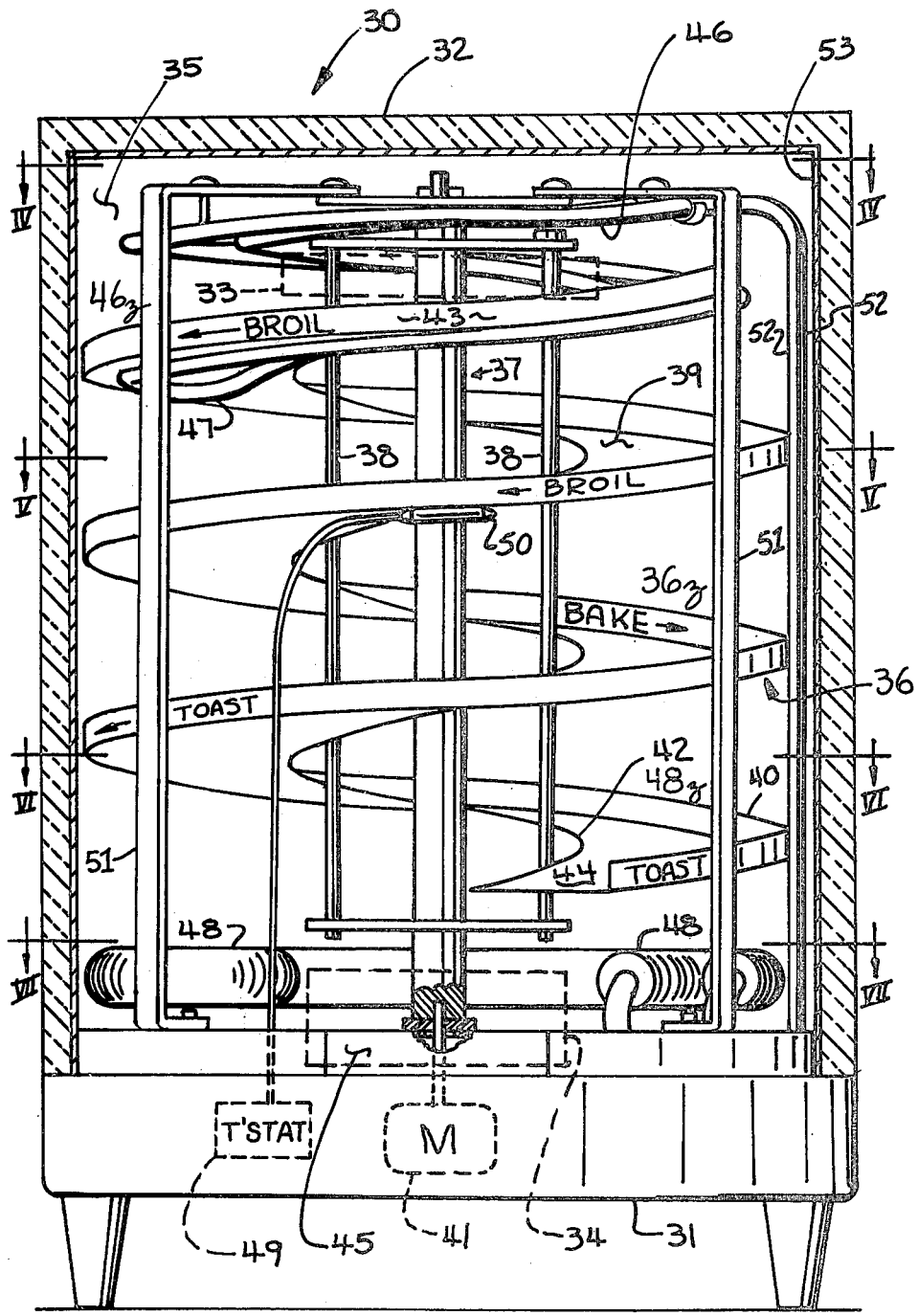
FIG. 3 is a front elevational sectional view of the preferred structural embodiment of the food oven of the present invention.
Figure 4:
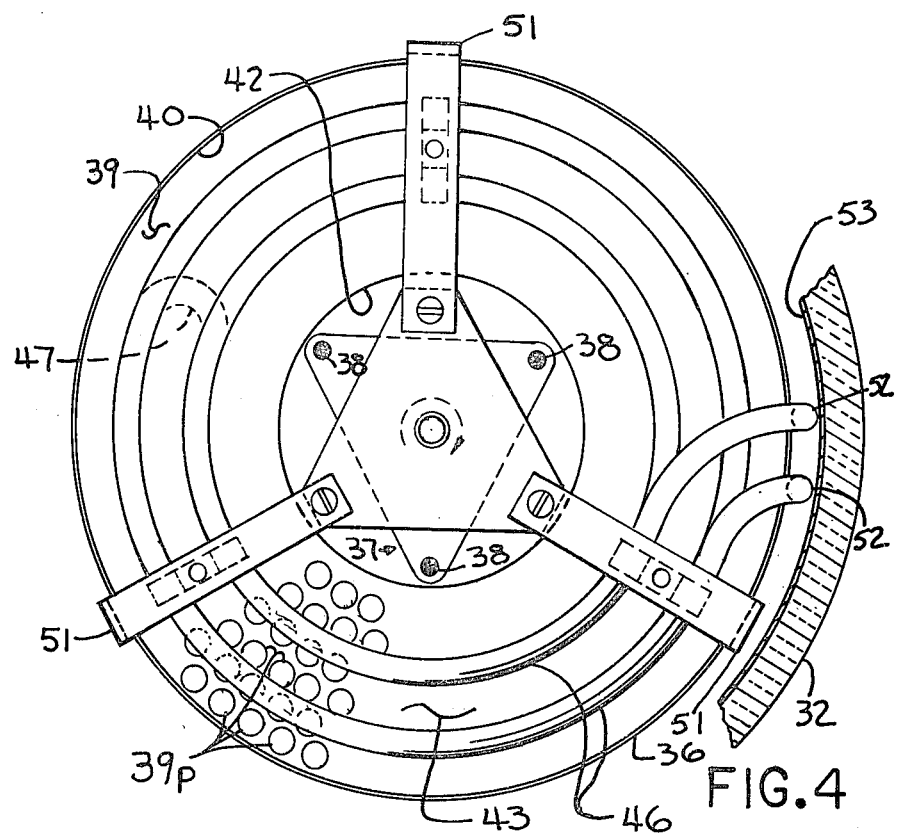
FIG. 4 is top view taken along lines IV-IV of FIG. 3.

Another important feature of the oven 30 is the construction of a helical trackway of minimum size and a cabinet of minimum size. FIGS. 3 and 4 show the helical trackway 36 having support members 51 mounted to the outside of the trackway 36. At least two support members 51 are required and three are preferred. The support members 51 are mounted with their bottom ends to the bottom base 31 of the oven chamber 35, supporting the trackway 36 above the bottom base 31. The electrical radiant heater element 46 mounted above the trackway 36 has connector portions 52 extending down alongside and adjacent to the outside of the trackway 36 to the bottom base 31 where the connector portions 52 are electrically connected to a power source. The oven cover 32 has an inner cylindrical wall 53 mounted and positioned as close as possible to the support members 51 and heater connectors 52. With this configuration the diameter and surface area of the wall 53 are minimized and therefore the heat transfer area is minimized. As best shown in FIGS. 4, 5 and 6 the heater connector portions 52 are positioned angularly between the support members 51 from and about the axis of the trackway 36A and have a non-heating low resistance electrical conductor from top to bottom so that there is no concentrated hot spot in or near the oven inner wall 53. This configuration of trackway 36, heater 46, and connector portion 52 has been found to significantly reduce energy consumption by eliminating hot spots in the wall 52 and insulation 32 immediately adjacent to the connector portions 52.

In operation and use of the oven 30, the oven chamber 35 is preheated and held at an operating temperature by the top radiant heater element 46 and the drive reel 37 is continually rotating. A food article 29, in tray 26, is loaded into the oven chamber 35 through the inlet 33 and placed upon the trackway loading end 43. The food article 29 is immediately being broiled by heat from the radiant heater 46 and one of the drive means 38 will engage the food article 29 and begin to advance it around the trackway 36 between the coils of the radiant heater 46 and through the broiling zone 46z. When the food article 29 is first placed in the oven chamber 35, the surrounding air will be immediately cooled and will draft down over the thermostat sensor 50 which is mounted only one level below the loading end 43, and the thermostat 49 will turn on the convective toasting heater 48. As the food article 29 is advanced around the trackway 36 on the support surface 39, the food article 29 will go past the radiant heater end 47 and radiant heating of the bottom of the food article 29 will be terminated while the top of the food article 29 will be radiantly broiled for yet a complete revolution of travel on the trackway 36. During the time the food article 29 is above the radiant heater 46, part of the radiant heat will pass through the perforations 39p of trackway 36 and against the bottom of the food article 29. The radiant heater 46 will throw heat through the support surface 39 below the heater 46 as the support surface 39 is about one-half perforated, the next down level of support surface 39 will receive radiant heat of about one-eighth the intensity of the radial heat applied to the support surface 39 directly below the heater 46.

When the food article 29 is then advanced below and beyond the end 47 of radiant heater 46, it is transferred into the intermediate section of the trackway 36 which forms the baking zone 36z. The baking zone 36z is not directly heated by either of heaters 46 or 48 but is indirectly heated by both as air convectively moves around the inside of the oven chamber 35.

As the food is advanced almost to a position directly above and one level above the unloading end 44, the food article 29 is then transferred into the toasting zone 48z where the support surface 39 is directly above and is directly exposed to the relatively massive heat being given off by the convection heater 48.

When the convection heater 48 is on, the air temperature in the bottom of the oven chamber 35 will exceed the temperature of air in the upper part of the oven chamer 35 by at least 200° F. (111° C.) and the hot air convectively rising off of the heater 48 will rise upwardly and pass around the trackway 36 and also through the perforations 39p of support surface 39 to heat the baking zone 36z. As the food article 29 is further advanced, it will go through the toasting zone 48z, be toasted and as it is pushed off of the loading end 44, it will fall on to the discharge ramp 45 and go out through the outlet 34.

After the food article 29 has been discharged, the top heater 46 remains on but the lower heater 48 is usually turned off by the thermostat 49. It should also be noted, the sensor 50 is shielded from each of the heaters 46 and 48 by a layer of the support surface 39. As shown in FIG. 5, several food articles 29 can be loaded into the oven 30, one food article 29 after another.

It has been found that the oven 30 works equally well with either frozen or unfrozen foods. For example, an unfrozen pizza can be cooked and browned in two minutes whereas a frozen pizza will be thawed, cooked and browned in three minutes, the longer time being obtained by slowing down the drive reel 37. In addition to the layered foods, and the open bottom tray 26 which were previously described, the oven 30 is very useful for other foods. As an example, the oven 30 given excellent results with fish, meat and poultry, patties, potatoes, eggs and omelets. Foods of these types maybe run through the oven 30 using closed bottom pans.

The oven 30 is quite efficient in use of electricity, and the oven 30 with a 575 watt top heater and a 2000 watt bottom heater will idle and hold at a preheated 575/600° F. (300/315° C.) on about 4KWH over an eight hour operating day. This is extremely efficient for an oven of this type. The oven 30 also has massive cooking power and when the large bottom convective heater 48 is turned on, the oven 30 can continually handle and heat food articles, just as does a conveyor line oven in a factory.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. In an electrically powerable rotary food oven for heating a food article and having
    a cabinet defining a heatable oven chamber therewithin,
    a vertical axis trackway within the oven chamber and having an annular surface for supporting a food article thereon, the annular support surface having a loading end for receiving a food package to be heated and an unloading end for the discharge of a heated food package,
    an inlet through the cabinet and into the oven chamber for loading of a food package upon the trackway loading end,
    a reel being rotatable about the axis of the trackway and having a drive member engagable with a food article on the trackway for advancing the food article around the trackway from the loading end to the unloading end, and
    an outlet through the cabinet and from the oven chamber leading from the unloading end of the trackway for discharge of a heated food article from the oven; the improvement comprising:
    (a) a broiling zone inclusive of a first portion of the length of the trackway adjacent to and including the loading end, the broiling zone being that portion of the trackway having a radiant electrical heater element mounted directly atop of the trackway support surface in directly exposed relationship thereto for applying radiant heat downwardly and directly upon the top of a food article being advanced around the trackway for the loading end immediately after the food article has been placed in the oven;
    (b) a toasting zone inclusive of the last portion of the length of the trackway adjacent to and including the unloading end, the toasting zone being that portion of the trackway having an electrical air heater element mounted below and underneath the trackway support surface for convective hot air heating and toasting of the bottom of a food article being advanced on the trackway through the toasting zone and over the air heater element immediately prior to unloading of the food article from the oven; and
    (c) a baking zone along a middle portion of the length of the trackway in between and separate from and separating the broiling zone and the toasting zone from one another, the baking zone not having a heating element and not being directly exposed to either of the said heater elements and being heatable by convective flow of air heated by the broiling or toasting electrical heater elements.

2. An oven improvement according to claim 1, in which the broiling zone heater extends over and directly above the loading end of the trackway in directly exposed relationship thereto, and in which the inlet through the cabinet leads directly onto the trackway loading end and is at an elevational level in between the elevational level of that portion of the broiling zone heater element directly above the loading end, and the elevational level of the loading end, for loading of the food article onto the trackway in immediate direct exposure to the broiling heater element.

3. In an oven improvement according to claim 2, the further improvement comprising:
    a contiguous portion of the broiling zone radiant heater element extending immediately underneath and in directly exposed relationship to the underside of the loading end of the trackway, with there being a substantially greater portion of the radiant heater element above the trackway than that portion which is underneath and so directly exposed to the underside.

4. In an oven improvement according to claim 3, in which the broiling zone radiant heater element is connected to be normally on and in which the toasting zone convective heater element is connected to be normally off,
    the further improvement comprising a thermostat operatively connected to the toasting zone heater element and having an air temperature sensor mounted to the trackway in the baking zone and remote from the toasting zone, for controlling the toasting zone heater is response to and as a function of the air temperature sensed within the baking zone.

5. An oven according to claim 1, in which the trackway is a multilevel helical trackway, and in which the baking zone is above the toasting zone and below the broiling zone.

6. An oven according to claim 5, in which the toasting zone convective heater element is normally off and is operatively connected to a control thermostat having a temperature sensing element mounted within the braking zone, said inlet and outlet being one above the other with the sensor being therebetween and spaced below the inlet and spaced above the outlet, for control of the toasting zone heater element in response to sensing of the temperature of the air at the level of the baking zone in between the inlet and outlet.

7. An oven according to claim 5, in which the broiling zone radiant heater is normally on and in which the toasting zone convective heater is normally off and is controllably connected to a thermostat having a temperature sensing element mounted in the baking zone for control of the toasting zone convective heated element in response to sensing of the temperature of air at the level of the baking zone, said toasting zone convective heater element being of at least twice the wattage of said broiling zone radiant heater element.

8. An oven according to claim 5, in which the toasting zone heater element is a semi-circular C-shaped coil which is underneath the trackway and has an arcuate length of less than 360 degrees, the outlet for food items being between arcuate ends of the C-shaped coil.

* * * * *